US010047168B2

(12) United States Patent
Mazoyer et al.

(10) Patent No.: US 10,047,168 B2
(45) Date of Patent: *Aug. 14, 2018

(54) PROCESS FOR THE PREPARATION OF PURIFIED β-(1,3)-D-GLUCANS

(71) Applicant: Cargill, Incorporated, Wayzata, MN (US)

(72) Inventors: Jacques André Christian Mazoyer, Carentan (FR); Jean-Pierre Lhonneur, Carentan (FR)

(73) Assignee: Cargill. Incorporated, Wayzata, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/515,575

(22) Filed: Oct. 16, 2014

(65) Prior Publication Data

US 2015/0038696 A1 Feb. 5, 2015

Related U.S. Application Data

(62) Division of application No. 12/742,388, filed as application No. PCT/EP2008/007236 on Sep. 4, 2008.

(30) Foreign Application Priority Data

Nov. 13, 2007 (EP) .................................... 07022025

(51) Int. Cl.
C08B 37/00 (2006.01)
(52) U.S. Cl.
CPC ................ *C08B 37/0024* (2013.01)
(58) Field of Classification Search
CPC .......................... C08B 37/0024; A61K 31/716
USPC ..................... 536/127, 124, 123.12
See application file for complete search history.

(56) References Cited

U.S. PATENT DOCUMENTS

| 3,301,848 A | 1/1967 | Halleck |
| 4,774,093 A | 9/1988 | Provonchee et al. |
| 4,950,749 A * | 8/1990 | Johal et al. ................ 536/127 |
| 5,224,988 A | 7/1993 | Pirri et al. |
| 5,688,775 A | 11/1997 | Renn et al. |
| 2002/0106430 A1 | 8/2002 | Cahill, Jr. et al. |

FOREIGN PATENT DOCUMENTS

| EP | 0266163 | 5/1988 |
| JP | 2004-32177 A | 11/2004 |

OTHER PUBLICATIONS

"Biochemical Separations" Ullmann's Encyclopedia of Industrial Chemistry, 6th Edition, vol. 5, p. 241 ff., 2003, Wiley-VCH, Weinheim.
"Material Data Safety Sheet" for Actigum™ CS6, According to ISO 11014-1 and CEE 91/155, 3 pgs., PN 1009-28/02/07-1.
Englische Ubersetzung von D1.
L. Johansson et al., Food Chemistry 97 (2006) 71-79 Jun. 25, 1985.
Versuchsergebnisse zur "saure Hydrolyse" der β-(1,3)-D-Glucane.
Sletmoen et al., Biopolymers 89 No. 4 (Jan. 9, 2008), 310-321.
Yanaki et al., Carbohydrate Polymers 5 (1985), 275-283.
Versuchsergebnisse "Erhitzen bei konstantem Volumen".
Versuchsergebnisse „Beispiel 1 der D3 mit ACTIGUM CS6®.
Versuchsergebnisse,, Erhitzen bei knostantem Druck.

* cited by examiner

*Primary Examiner* — Shaojia Anna Jiang
*Assistant Examiner* — Michael C Henry

(57) ABSTRACT

There is provided a process for the preparation of purified β-(1,3)-D-glucans, comprising the steps of providing an aqueous β-(1,3)-D-glucan initial solution having a pH of above 11.0, filtering the aqueous β-(1,3)-D-glucan initial solution to obtain a β-(1,3)-D-glucan containing filtrate, adjusting the pH of the β-(1,3)-D-glucan containing filtrate with an acid to a pH of below 5.0 to obtain an acidic β-(1,3)-D-glucan solution, and heating the acidic β-(1,3)-D-glucan solution to a temperature in the range of 60 to 160° C.

19 Claims, No Drawings

PROCESS FOR THE PREPARATION OF PURIFIED β-(1,3)-D-GLUCANS

This application is a Divisional of U.S. patent application Ser. No. 12/742,388, filed Sep. 9, 2010, entitled PROCESS FOR THE PREPARATION OF PURIFIED β-(1,3)-D-GLUCANS, which is a national phase application of International Application PCT/EP2008/007236, filed Sep. 4, 2008, entitled PROCESS FOR THE PREPARATION OF PURIFIED β-(1,3)-D-GLUCANS, which claims the benefit of the European Patent Application Serial No. 07022025.6, filed Nov. 13, 2007, entitled PROCESS FOR THE PREPARATION OF PURIFIED β-(1,3)-D-GLUCANS, which are hereby incorporated by reference in their entirety.

The present invention relates to a process for the preparation of purified β-(1,3)-D-glucans which comprises the key steps of alkalizing an aqueous β-(1,3)-D-glucan initial solution to reduce the viscosity of the solution, filtering the low-viscosity solution and recovering the initial viscosity by acidifying and heating the obtained β-(1,3)-D-glucan containing filtrate.

The class of polysaccharides classified as β-(1,3)-D-glucans are characterized by a backbone of D-glucose residues linked in β-(1,3) fashion, wherein the different β-(1,3)-D-glucans structurally differ from each other in terms of their side groups and molecular weights. Curdlan, for example, consists exclusively of the β-(1,3)-D-glucose backbone, whereas schizophyllan, scleroglucan and yeast glucan contain β-(1,6)-glycosyl side chains. Due to their strongly thickening and unique rheological properties, these polysaccharides have found many industrial applications, especially in the human or animal food field, as ingredients in cosmetics, water colors, printing inks, and in the oil industry, for example in drilling muds, spacer fluids, and as stabilizers in asphalt emulsions.

Polysaccharides of the β-(1,3)-D-glucan type are typically produced by microbial fermentation and the fermentation broth is often used directly and in diluted form, usually after having been pasteurized (see, e.g., U.S. Pat. No. 3,301,848). For certain uses, however, β-(1,3)-D-glucans of higher purity are needed that should not contain microbial cells and/or other water-soluble constituents of the fermentation broth.

In this case, a precipitation method is commonly used that includes the addition of a water-soluble organic solvent, typically isopropyl alcohol, or another precipitation agent, such as polyethylene glycol, to precipitate the β-(1,3)-D-glucan (see, e.g., EP 0 266 163 A2 and U.S. Pat. No. 3,301,848). After precipitation, the precipitate is separated from the aqueous medium by filtration or, more preferably, by centrifugation. The resulting precipitate or 'coagulum' may then be pressed to remove as much as possible of the liquid contained therein, and may then be dried and milled into a β-(1,3)-D-glucan powder, as known in the art (see, e.g., U.S. Pat. Nos. 5,224,988 and 3,301,848).

However, while the precipitation of β-(1,3)-D-glucans directly from the fermentation broth may offer good recovery yields, the obtained precipitate is admixed with microbial cells and, thus, cannot be used for certain applications. Therefore, it is desired that the precipitation of the β-(1,3)-D-glucan starts from a cell-free solution, which may be obtained by any convenient techniques, such as filtration or centrifugation.

A particular favourable technique to separate the β-(1,3)-D-glucans from other constituents of the fermentation broth, in particular microbial cells, is filtration. Current filtration techniques of β-(1,3)-D-glucan containing solution, however, suffer from the drawback that such solutions are too viscous to be easily filtered (see, e.g., EP 0 266 163 A2 and U.S. Pat. No. 3,301,848). In particular, the high viscosity may lead to an increased filtration pressure or a complete blockage of the filtration. For this reason, current procedures involve the step of diluting the β-(1,3)-D-glucan containing solution with a high amount of a solvent prior to filtration for reasons of viscosity reduction. As a consequence, the conventional processes are unsatisfactory in terms of productivity and production costs.

The present invention therefore aims at the provision of a process for the preparation of purified β-(1,3)-D-glucans, which provides high production yields and is more cost-efficient than the existing β-(1,3)-D-glucan preparation processes.

It has been surprisingly found that this problem is solved by the process as claimed, which includes the key steps of alkalizing an aqueous β-(1,3)-D-glucan initial solution by adding a base to produce a less viscous solution, filtering the low-viscosity solution, and recovering the initial viscosity by acidifying the obtained filtrate by the use of an acid and heating the resulting acidic β-(1,3)-D-glucan solution.

The process of the present invention enables the filtration of undiluted aqueous β-(1,3)-D-glucan initial solutions that contain high concentrations of β-(1,3)-D-glucans, much higher than the concentrations of the solutions that can be employed in conventional processes, while the viscosities of the finally obtained β-(1,3)-D-glucans are similar compared to the conventional processes. Hence, the process of the present invention exhibits a significantly increased process productivity. In addition, no or only limited amounts of reagents to dilute the solutions to be filtered are needed. As a consequence, the process of the present invention is much more cost-efficient than the conventional processes.

More specifically, the process of the present invention comprises the following steps:

(a) providing an aqueous β-(1,3)-D-glucan initial solution having a pH of above 11.0;
(b) filtering the aqueous β-(1,3)-D-glucan initial solution to obtain a β-(1,3)-D-glucan containing filtrate;
(c) adjusting the pH of the β-(1,3)-D-glucan containing filtrate with an acid to a pH of below 5.0 to obtain an acidic β-(1,3)-D-glucan solution;
(d) heating the acidic β-(1,3)-D-glucan solution to a temperature in the range of 60 to 160° C.

The β-(1,3)-D-glucan initial solution provided in step (a) of the process of the present invention may be any aqueous solution that contains β-(1,3)-D-glucans. The β-(1,3)-D-glucan may be contained in the initial solution in high concentrations of 5 g/l or more, especially 10 g/l or 20 g/l or more, up to such high concentrations as 40 or 50 g/l or yet higher concentrations. Typically, the initial solution is a fermentation broth, a reconstituted solution of an unrefined β-(1,3)-D-glucan or any other unrefined β-(1,3)-D-glucan preparation. These initial β-(1,3)-D-glucan solutions may optionally contain low amounts, preferably 0 to 10% by weight, more preferably 0 to 5% by weight, of admixed additional substances, such as salts, surfactants, complexing agents, and the like.

A 'fermentation broth' according to the present invention is any solution obtained after fermenting a medium, such as a medium based on sugar and inorganic salts, by the action of microorganisms which have the ability to produce β-(1,3)-D-glucans. A fermentation broth therefore contains, inter alia, the microorganisms used for the fermentation, unfermented fermentation medium and fermentation metabolits. A fermentation broth in the sense of the present invention may further be a fermentation broth, which has been sterilized or pasteurized before filtration. The microorganism used for the fermentation may be bacteria, fungi and algae. The fermentation is carried out as known in the art and described, for example, in U.S. Pat. No. 3,301,848.

A 'reconstituted solution' of an 'unrefined β-(1,3)-D-glucan', when used herein, comprises any solution obtainable by dissolving an unrefined β-(1,3)-D-glucan powder in a suitable solvent, such as water. The term 'unrefined β-(1,3)-D-glucan' is intended to mean a β-(1,3)-D-glucan preparation in liquid or, more typically, solid form, which comprises microbial cells or at least fragments thereof. Examples thereof include dried or alcohol treated fermentation broths. The dried fermentation broths are usually in the form of a powder and typically contain about 5 to 60% by weight β-(1,3)-D-glucan, wherein the rest essentially consists of cells and remaining minor amounts of water.

The β-(1,3)-D-glucans used within the present invention include any polysaccharides classified as β-(1,3)-D-glucans, i.e. any polysaccharide which has a β-(1,3)-linked backbone of D-glucose residues. Examples of such β-(1,3)-D-glucans include curdlan (a homopolymer of β-(1,3)-linked D-glucose residues produced from, e.g., *Agrobacterium* spp.), grifolan (a branched β-(1,3)-D-glucan produced from, e.g., the fungus *Grifola frondosa*), lentinan (a branched β-(1,3)-D-glucan having two glucose branches attached at each fifth glucose residue of the β-(1,3)-backbone produces from, e.g., the fungus *Lentinus eeodes*), schizophyllan (a branched β-(1,3)-D-glucan having one glucose branch for every third glucose residue in the β-(1,3)-backbone produced from, e.g., the fungus *Schizophyllan commune*), scleroglucan (a branched β-(1,3)-D-glucan with one out of three glucose molecules of the β-(1,3)-backbone being linked to a side D-glucose unit by a (1,6)-β bond produced from, e.g., fungi of the *Sclerotium* spp.), SSG (a highly branched β-(1,3)-glucan produced from, e.g., the fungus *Sclerotinia sclerotiorum*), soluble glucans from yeast (a β-(1,3)-D-glucan with β-(1,6)-linked side groups produced from, e.g., *Saccharomyces cerevisiae*), and laminarin (a β-(1,3)-glucan with β-(1,3)-glucan and β-(1,6)-glucan side groups produced from, e.g., the brown algae *Laminaria digitata*).

Preferably, the β-(1,3)-D-glucan used in the present invention contains no side groups, such as curdlan, or branches of one or more glucose residues that are bonded to the β-(1,3)-backbone via β-(1,6)-linkages, such as schizophyllan and scleroglucan. A particularly preferred β-(1,3)-D-glucan for use herein is scleroglucan.

In step (a) of the process according to the present invention, the pH of the β-(1,3)-D-glucan initial solution may be adjusted as known in the art, for example, by the use of any organic or inorganic base. According to the present invention, the pH is preferably adjusted by means of an alkaline compound, which has a potassium ion as a cation, such as potassium hydroxide, potassium carbonate or potassium bicarbonate. However, although less preferred, sodium hydroxide may also be used. The pH of the β-(1,3)-D-glucan initial solution is preferably set to above 11.0, more preferably to above 12.0, yet more preferably to above 12.2 and most preferably to above 12.3. Under such highly alkaline conditions, the β-(1,3)-D-glucan triple helix exists in a denatured state in which the triple-stranded helical structure is disrupted and the strands are separated. This leads to a strongly decreased viscosity and in turn greatly facilitates the purification process because higher concentrated β-(1,3)-D-glucan solutions can be used without the the risk of filtration blockages or unfavourably increased filtration pressures.

The provision of the β-(1,3)-D-glucan initial solution is preferably carried out under agitation, in particular stirring, to ensure a homogeneous solution. The stirring speed is of only minor importance with respect to yield and viscosity of the isolated and purified β-(1,3)-D-glucan and may be in the range of 10 to 150 rpm. Typically, the stirring is in carried out at stirring speeds of 40 to 80 rpm.

In a preferred embodiment of the present invention, the provision of the β-(1,3)-D-glucan initial solution in step (a) includes the step of adding a calcium complexing agent. The calcium complexing agent reduces the adverse effect of calcium ions on the filterability of β-(1,3)-D-glucans under strongly alkaline conditions. Suitable calcium complexing agents are, for example hexametaphosphate, citrate, oxalate, phosphates, carbonates and the like, wherein hexametaphosphate is particularly suitable for use within the present invention.

In another preferred embodiment of the present invention, the provision of the β-(1,3)-D-glucan initial solution in step (a) includes the step of heating the initial solution. The heating to an elevated temperature results in a more complete dissolution of the β-(1,3)-D-glucan, which is of particular importance in cases where a β-(1,3)-D-glucan powder is employed in the preparation of the β-(1,3)-D-glucan initial solution, and to accelerate the process of decreasing the viscosity at alkaline pH, as well as to improve the production yield. Preferably, a heating temperature in the range of 50 to 80° C. is used. The heating time depends on the heating temperature and is usually in the range of 1 to 24 h. Normally, a heating time of 1 to 6 h is sufficient for fully dissolving the β-(1,3)-D-glucan initial solution and/or achieving high yields and viscosities of the isolated and purified β-(1,3)-D-glucan. In a preferred embodiment, the heating time is about 4 h at 70° C.

In step (b) of the process according to the present invention, the aqueous β-(1,3)-D-glucan initial solution provided in step (a) is filtered to obtain a β-(1,3)-D-glucan containing filtrate. The obtained filtrate contains essentially no microbial cells or fragments thereof, such as mycelium, and only consists of water-soluble components, like the β-(1,3)-D-glucan itself and other water-soluble components from the aqueous β-(1,3)-D-glucan initial solution, such as salts, pigments, and the like.

The filtration can be carried out using any known filtration means. Within the context of the present invention, filtration aids, such as perlites, diatomites or cellulose, are preferably used. These filtration aids are added to the alkaline β-(1,3)-D-glucan solution or slurry under mixing in order to ensure a homogeneous dispersion. Typically, the weight ratio of filtration aid to β-(1,3)-D-glucan in the alkaline β-(1,3)-D-glucan solution is between 0.2 and 5, in particular between 0.5 and 2. The filtration aid containing alkaline aqueous β-(1,3)-D-glucan initial solution is then fed to a filter to separate the filtration aids. For the separation, any types of filters can be used, wherein press filters or plate filters are especially suitable for use herein. A decantor centrifuge may also be used, although being less preferable compared to press filters or plate filters. Optionally, the filtration step may also include a step of recycling until a clear solution is obtained, which is then separated from the microbial cells as described above.

The temperature of the aqueous β-(1,3)-D-glucan initial solution during the filtration depends on the particular filtration means used, the nature of the β-(1,3)-D-glucan to be purified, and other factors. Typically, the filtration temperature is in the range of 50 to 90° C., preferably in the range of 70 to 85° C., and is particularly preferred 80° C.

In step (c) of the process according to the present invention, the filtrate obtained in step (b) is acidified by adding an acid to the β-(1,3)-D-glucan containing filtrate to lower is the pH of the resulting acidic β-(1,3)-D-glucan solution to below 5.0, preferably to below 4, more preferably to below 3. A particular preferred pH range is 2 to 4. For adjusting the pH any acids can be used, except those that give an insoluble salt with calcium ions, such as sulphuric acid or phosphoric acid. Preferably, hydrochloride acid is used.

In step (d) of the process according to the present invention, the acidic β-(1,3)-D-glucan solution obtained in step (c) is heat treated to recover the initial viscosity of the β-(1,3)-D-glucan. Preferably the heat treatment includes heating the acidic β-(1,3)-D-glucan solution to a temperature in the range of 60 to 160° C., preferably 80 to 140° C., more preferably 100 to 120° C. The heating times depend on the heating temperatures and can be readily determined by a person skilled in the art by routine experimentation. Typically, the heating times range from seconds in the case of high temperatures to hours in the case of low temperatures. For example, heating times of 20 s may be sufficient at a heating temperature of 130° C., whereas at a heating temperature of 120° C. a heating time of about 1 min may be required. A batch treatment at 90° C. for 3 h may also be suitably used to recover the viscosity of the β-(1,3)-D-glucan.

The heating may be carried out in batch or UHT mode. In the batch mode a large volume of the β-(1,3)-D-glucan solution is treated for a long period of time, typically more than 10 minutes. The UHT treatment is a continuous heating where a volume of the β-(1,3)-D-glucan solution is heat treated for a short period of time of usually less than 10 minutes. The UHT method also allows treating large volumes, but in a continuous flow mode. The heating time can be increased as desired by an additional stage called 'chambrage'.

After step (d) of the process according to the present invention, the obtained β-(1,3)-D-glucan containing solution can be further processed as desired. If, for example, it is desired to separate other water-soluble constituents contained within the β-(1,3)-D-glucan initial solution, the β-(1,3)-D-glucan may be mixed with any known precipitation agent in sufficient quantity to precipitate the β-(1,3)-D-glucan. The precipitation agent may be, for example, a solvent, in particular an alcohol, such as methyl, ethyl, propyl alcohol, or acetone. For carrying out the precipitation, conveniently, a sufficient amount of precipitation agent at a desired temperature is added to the heated β-(1,3)-D-glucan containing solution obtained from step (d). Usually, the precipitation temperature of the resulting solution is in the range of 70 to 100° C., preferably in the range of 80 to 95° C. Typically, the precipitation temperature is 90° C.

After precipitation, the β-(1,3)-D-glucan can be separated from the liquid by any convenient method, such as filtration, centrifugation, or decantation. If desired, the obtained β-(1,3)-D-glucan product may be further purified by washing with one of the above-mentioned organic solvents or by redispersing the β-(1,3)-D-glucan in water and reprecipitating in the same manner as described above.

A preferred precipitation method in the context of the present invention is an alcohol precipitation method using isopropyl alcohol. More specifically, the solution containing the β-(1,3)-D-glucan is mixed with an equivalent or larger volume of isopropyl alcohol, typically 1 to 1.5 parts per weight, based on 1 part per weight of the β-(1,3)-D-glucan containing solution. The precipitation is typically carried out at an elevated temperature, such as at 90° C. Preferably, the obtained precipitate is then washed at least once with 70% isopropyl alcohol to obtain a fibrous product of β-(1,3)-D-glucan that includes water and solvent.

The thus obtained purified β-(1,3)-D-glucan product may then be converted into the form of a powder by drying the β-(1,3)-D-glucan product in any known manner, such as air drying, alcohol or acetone drying, spray drying, drum drying or fluidized bed drying. Before drying, the purified β-(1,3)-D-glucan product may also be pressed to remove as much as possible of the liquid contained therein. The dried product is then crushed and/or grinded to form a powder, which can be conveniently used for a broad range of applications.

The present invention will now be further illustrated by the following examples.

EXAMPLES

The following experimental results demonstrate the beneficial properties of the present for the preparation of purified scleroglucan, a β-(1,3)-D-glucan with a β-(1,6)-linked side D-glucose residue for every third glucose in the β-(1,3)-backbone, compared to a commonly used purification process. In particular, it was found that the viscosity of the scleroglucan solution before filtration can be drastically decreased at high pH values, and that the viscosity of the filtrate could be restored to about the same values as those obtained in the conventional process by lowering the pH into an acidic range and heat treating the acidic solution. It was further shown that the yield of the process according to the present invention was about the same as that of the conventional process. Thus, the process of the present invention allows to filter highly concentrated scleroglucan solutions which contain about five times more scleroglucan than the scleroglucan solutions that can be used in the conventional process. As a result thereof, the productivity of the process of the present invention is significantly improved compared to the conventional process and, thus, offers large cost-saving potentials.

Comparative Example

Purification of Scleroglucan According to the Conventional Process

A volume of 150 l tap water was heated to 80° C. and 2.4 kg of polytran N (final concentration: 8 g/l) (dried alcohol treated fermentation broth in powder form, available from Cargill of Baupte, France, under the trade name of ACTIGUM CS6) were added under stirring at 80 rpm, followed by stirring at 80° C. for 2 h. Next, 5.625 kg of floM (final concentration: 18.75 g/l) (a perlite type filtering aid, available from Ceca of Honfleur, France, under the trade name CLARCEL FloM) were added and the resulting mixture was diluted with water up to a volume of 300 l and continuously stirred for 14 h at 80° C. The mixture was then filtrated using a filter-press (available from Choquenet of Chauny, France) at a pressure of from 1 to 4 bars at a temperature of 80° C.

The obtained filtrate was added with 1 part by weight of isopropyl alcohol, based on 1 part by weight of the filtrate, to precipitate the scleroglucan. The precipitate was let to drain using a nylon filter and re-washed with 1 part by weight 70% isopropyl alcohol. The final precipitate was pressed using a Coq screw-press. Finally, the pressed scleroglucan was dried in an air-fluidized bed dryer at 75° C., followed by grinding and sieving, using a blade-mill with standard sieve, to obtain a scleroglucan powder having a particle size of about 250 µm.

The yield, viscosity and pH of the scleroglucan obtained by this conventional process are shown in Table 1. The pH and viscosity values were determined by measuring a 1% scleroglucan solution, prepared by re-dissolving 1% by weight of the obtained 250 µm scleroglucan powder in deionised water, at 25° C. using a pH meter and a Brookfield viscosimeter, respectively. The yield corresponds to the percentage of the dry weight of the obtained scleroglucan powder based on the dry weight of the employed polytran N powder.

TABLE 1

Yield, viscosity and pH of conventionally purified scleroglucan

| Yield (%) | Viscosity (cP) | pH |
|---|---|---|
| 51 | 3600 | 7.8 |

It is noted that the process parameters used in this Example correspond to optimized process parameters determined in a series of preliminary tests. In these preliminary tests it was found that the optimal conditions for obtaining high yields and high viscosities includes heating the polytran N starting solution to about 80° C. A further increase of the temperature did not significantly improve the yield or enhance the viscosity. A solubilization time of 16 h at the increased temperature of, e.g. 80° C., were shown to be sufficient to achieve high yields and viscosities. In addition, it was demonstrated that the mixing speed is of only minor importance. Furthermore and importantly, it was determined that the filtration gets blocked at polytran N concentrations of above 8 g/l. Consequently, the conventional scleroglucan purification process was carried out using polytran N in a concentration of 8 g/l, which was solubilized at 80° C. for 16 h under stirring at 80 rpm.

Inventive Example

Purification of Scleroglucan According to the Alkaline Process of the Present Invention A volume of 300 l water was heated to 60° C. and 0.599 kg sodium hexametaphosphate (corresponding to a ratio of hexametaphosphate to polytran N in the final solution of 0.057:1.0), as well as 5.04 kg potassium hydroxide (corresponding to a ratio of potassium hydroxide to polytran N in the final solution of 0.48:1.0) were added, followed by the addition of 10.5 kg polytran N (corresponding to a final concentration of about 35 g/l). The resulting mixture was maintained at 60° C. and stirred for 16 h at 80 rpm. After the stirring was completed, 7.38 kg of floM (final concentration of about 28 g/l) were added under stirring, followed by continued stirring for about 15 minutes. Then, the mixture was filtered using a filter-press (available from Choquenet of Chauny, France).

After the filtration, the pH of the filtrate was adjusted to 3 by adding hydrochloric acid (about 15 l of 6 N HCl). The acidic solution was then heated from 60° C. to 110° C. in about 15 minutes and then maintained during 10 minutes at 110° C. The obtained heated filtrate was added with 1.5 parts by weight isopropyl alcohol, based on 1 part by weight of the filtrate, to precipitate the scleroglucan. The precipitate was let to drain using a nylon filter and re-washed with 1 part by weight 70% isopropyl alcohol. Then, the final precipitate was pressed using a Coq screw-press and the pressed scleroglucan was dried, followed by grinding and sieving as described in connection with the comparative example to obtain a scleroglucan powder having a particle size of about 250 µm.

The change of the viscosity in the course of the above-described process is shown in Table 2 and the properties of the finally obtained scleroglucan with respect to yield, viscosity and pH are shown in Table 3. The pH, viscosity, and yield were determined as described in connection with the comparative example.

TABLE 2

Change of viscosity in the course of the process of the present invention.

| Viscosity (cP) | | | |
|---|---|---|---|
| Solution before filtration | Alkaline filtrate | Filtrate set to pH 3.0 | Heat treated filtrate pH 3.0 |
| 210 | 13 | 193 | 3100 |

The viscosity values shown in Table 2 demonstrate that the viscosity of a solution of polytran N (35 g/l) drops off to a viscosity of less than about 20 cP after the steps of alkalinization and filtration, followed by a viscosity increase to above 3000 cP.

TABLE 3

Yield, viscosity and pH of the scleroglucan purified according to the process of the present invention.

| Yield (%) | Viscosity (cP) | pH |
|---|---|---|
| 50 | 3300 | 5.8 |

As evident from Table 3, the scleroglucan purified by the present invention was obtained in about the same yield and exhibits about the same viscosity as conventionally purified scleroglucan (see Table 1). However, the process of the present invention allows using much higher concentrated scleroglucan solutions resulting in a strongly increased productivity. More specifically, it was found that solutions with a polytran N concentration of up to 40 g/l could be filtered without any problems. At concentrations above 40 g/l the pressure needed for filtration starts to increase, rendering the filtration more difficult (results not shown).

The invention claimed is:

1. A process for preparing scleroglucan or schizophyllan, comprising:
 (a) obtaining an aqueous scleroglucan or schizophyllan initial solution having an initial viscosity;
 (b) raising the pH of the scleroglucan or schizophyllan initial solution to obtain an alkalized scleroglucan or schizophyllan solution having a pH above 11.0 and a viscosity lower than the initial viscosity;
 (c) filtering the scleroglucan or schizophyllan solution from step (b) to obtain a scleroglucan or schizophyllan containing filtrate;
 (d) lowering the pH of the scleroglucan or schizophyllan containing filtrate to obtain an acidic scleroglucan or schizophyllan solution having a pH of below 5.0; and (e) heating the acidic scleroglucan or schizophyllan solution from step (d) to a temperature in the range of 60° C. to 160° C. to increase viscosity to that over the viscosity from step (b).

2. The process according to claim 1, wherein the viscosity of the alkalized scleroglucan or schizophyllan solution in step (b) is lowered to less than about 210 cP.

3. The process according to claim 1, wherein the scleroglucan or schizophyllan containing filtrate in step (c) has a viscosity lower than the viscosity in step (b).

4. The process according to claim 1, wherein the acidic scleroglucan or schizophyllan solution from step (d) has a viscosity greater than the viscosity in step (b).

5. The process according to claim 1, wherein the heated scleroglucan or schizophyllan solution from step (e) has a viscosity of at least about 3000 cP.

6. The process according to claim 1, wherein the heated scleroglucan or schizophyllan solution from step (e) has a viscosity of at least ten times the viscosity in step (b).

7. The process according to claim 1, wherein the heated scleroglucan or schizophyllan solution from step (e) has a viscosity substantially similar to the initial viscosity in step (a).

8. The process according to claim 1, wherein the aqueous scleroglucan or schizophyllan initial solution comprises scleroglucan or schizophyllan and microbial cells or fragments thereof.

9. The process according to claim 1, wherein the aqueous scleroglucan or schizophyllan initial solution contains at least about 5 g/l scleroglucan or schizophyllan.

10. The process according to claim 1, wherein the pH in step (b) is raised using an alkaline compound.

11. The process according to claim 10, wherein the alkaline compound is selected from the group consisting of potassium hydroxide, potassium carbonate, and potassium bicarbonate.

12. The process according to claim 10, wherein the alkaline compound is sodium hydroxide.

13. The process according to claim 1, wherein in step (b) the pH of scleroglucan or schizophyllan initial solution is raised to above 12.0.

14. The process according to claim 1, wherein in step (d) the pH of the acidic scleroglucan or schizophyllan solution is below 4.

15. The process according to claim 1, wherein in step (d) the pH of the acidic scleroglucan or schizophyllan solution is below 3.

16. The process according to claim 1, wherein in step (d) the pH of the acidic scleroglucan or schizophyllan solution is between 2 and 4.

17. The process according to claim 1, wherein in step (e), the acidic scleroglucan or schizophyllan solution is heated to a temperature in the range of 80° C. to 140° C.

18. The process according to claim 1, wherein in step (e), the acidic scleroglucan or schizophyllan solution is heated to a temperature in the range of 85° C. to 135° C.

19. The process according to claim 1, wherein in step (e), the acidic scleroglucan or schizophyllan solution is heated to a temperature in the range of 100° C. to 120° C.

* * * * *